US011204140B2

(12) United States Patent
Shan et al.

(10) Patent No.: US 11,204,140 B2
(45) Date of Patent: Dec. 21, 2021

(54) ELECTRODELESS SIDE-MOUNTED LED STRING LIGHT, METHOD AND APPARATUS FOR MANUFACTURING THE SAME

(71) Applicant: Zhuhai Bojay Electronics Co. Ltd., Guangdong (CN)

(72) Inventors: Xiwan Shan, Guangdong (CN); Tuxiu Yang, Guangdong (CN); Yundong Ai, Guangdong (CN); Jie Zhang, Guangdong (CN); Qunlin Li, Guangdong (CN); Qiming Liu, Guangdong (CN); Su Yan, Guangdong (CN); Yanyong Liu, Guangdong (CN); Junchao He, Guangdong (CN); Jiahui Cai, Guangdong (CN); Yue Chen, Guangdong (CN)

(73) Assignee: Zhuhai Bojay Electronics Co. Ltd., Guangdong (CN)

( * ) Notice: Subject to any disclaimer, the term of this patent is extended or adjusted under 35 U.S.C. 154(b) by 0 days.

(21) Appl. No.: 16/888,286

(22) Filed: May 29, 2020

(65) Prior Publication Data

US 2021/0071829 A1     Mar. 11, 2021

(30) Foreign Application Priority Data

Sep. 6, 2019  (CN) .......................... 201910843961.1

(51) Int. Cl.
*F21S 4/26* (2016.01)
*B23K 9/007* (2006.01)
(Continued)

(52) U.S. Cl.
CPC ................ *F21S 4/26* (2016.01); *B23K 9/007* (2013.01); *B29C 45/14639* (2013.01);
(Continued)

(58) Field of Classification Search
CPC combination set(s) only.
See application file for complete search history.

(56) References Cited

U.S. PATENT DOCUMENTS

| 7,901,263 B2 | 3/2011 | Tsai |
|---|---|---|
| 7,926,978 B2 | 4/2011 | Tsai |

(Continued)

FOREIGN PATENT DOCUMENTS

| CN | 201688230 U | 12/2010 |
|---|---|---|
| GB | 2586903 A | 6/2020 |

(Continued)

OTHER PUBLICATIONS

U.S. Appl. No. 16/888,222 Non-Provisional Application, filed May 29, 2020, 29 pages.

(Continued)

*Primary Examiner* — Rajarshi Chakraborty
*Assistant Examiner* — Nathaniel J Lee
(74) *Attorney, Agent, or Firm* — Adsero IP

(57) ABSTRACT

An electrodeless side-mounted LED string light, a method and an apparatus for manufacturing the same are provided by the disclosure. The electrodeless side-mounted LED string light includes: a first wire and a second wire, a plurality of LED units and a plurality of encapsulants. Each LED unit includes a first surface-mounted LED and a second surface-mounted LED. Luminous surfaces of the first and second surface-mounted LEDs are opposite to each other. The luminous surfaces of the first and second surface-mounted LEDs are perpendicular to an axial direction of the first and second wires. The plurality of encapsulants respectively encapsulants the first and second surface-mounted LEDs therein. With the electrodeless side-mounted LED string light of the disclosure, the utilization rate of the lighting wire of the string light is improved, the utilization (Continued)

rates of raw materials and apparatus are improved, the product quality and manufacturing efficiency are improved.

2 Claims, 9 Drawing Sheets

(51) Int. Cl.

| | | |
|---|---|---|
| *B29C 45/14* | (2006.01) | |
| *F21K 9/90* | (2016.01) | |
| *F21V 19/00* | (2006.01) | |
| *F21V 23/00* | (2015.01) | |
| *F21V 31/00* | (2006.01) | |
| *F21Y 113/13* | (2016.01) | |
| *F21Y 103/10* | (2016.01) | |
| *F21Y 115/10* | (2016.01) | |
| *B29L 31/34* | (2006.01) | |

(52) U.S. Cl.
CPC .......... *B29C 45/14819* (2013.01); *F21K 9/90* (2013.01); *F21V 19/0025* (2013.01); *F21V 23/001* (2013.01); *F21V 31/005* (2013.01); *B29L 2031/34* (2013.01); *F21Y 2103/10* (2016.08); *F21Y 2113/13* (2016.08); *F21Y 2115/10* (2016.08)

(56) References Cited

U.S. PATENT DOCUMENTS

| | | |
|---|---|---|
| 10,281,094 B2 | 5/2019 | Liu |
| 10,907,781 B2 | 2/2021 | Shao |
| 10,920,941 B1 | 2/2021 | Shan et al. |
| 11,118,743 B2 | 9/2021 | Shan et al. |
| 2002/0089859 A1 | 7/2002 | Jackson et al. |
| 2005/0207151 A1 | 9/2005 | Aanegola et al. |
| 2007/0208395 A1 | 9/2007 | Leclerc et al. |
| 2008/0200089 A1 | 8/2008 | Tsai |
| 2011/0310601 A1 | 12/2011 | Shao |
| 2014/0009074 A1 | 1/2014 | Chen |
| 2014/0268818 A1 | 9/2014 | Huang et al. |
| 2015/0077999 A1 | 3/2015 | Chen |
| 2016/0341408 A1 | 11/2016 | Altamura |
| 2017/0328527 A1 | 11/2017 | Yang et al. |
| 2017/0336037 A1 | 11/2017 | Chien |
| 2018/0119929 A1 | 5/2018 | Weiss |
| 2018/0209595 A1 | 7/2018 | Liu |
| 2019/0069649 A1 | 3/2019 | Qin |
| 2019/0101254 A1* | 4/2019 | Tsai .................. H01L 33/00 |
| 2019/0234597 A1 | 8/2019 | Zhu |
| 2019/0277458 A1 | 9/2019 | Shao |
| 2019/0368670 A1 | 12/2019 | Gao |
| 2019/0376669 A1* | 12/2019 | Shao .................. A41G 1/007 |
| 2020/0278091 A1 | 9/2020 | Chen et al. |
| 2021/0071827 A1 | 3/2021 | Shan et al. |
| 2021/0071850 A1 | 3/2021 | Shan et al. |
| 2021/0071852 A1 | 3/2021 | Shan et al. |
| 2021/0071854 A1 | 3/2021 | Shan et al. |
| 2021/0071828 A1 | 6/2021 | Shan et al. |

FOREIGN PATENT DOCUMENTS

| | | |
|---|---|---|
| KR | 10-1629749 B1 | 6/2016 |
| WO | WO-2019-041745 A1 | 3/2019 |

OTHER PUBLICATIONS

U.S. Appl. No. 16/888,282 Non-Provisional Application, filed May 29, 2020, 36 pages.
U.S. Appl. No. 16/888,290 Non-Provisional Application, filed May 29, 2020, 31 pages.
U.S. Appl. No. 16/888,296 Non-Provisional Application, filed May 29, 2020, 39 pages.
GB Application No. GB2006270.9, Examination Report dated Jun. 12, 2020, 1 page.
GB Application No. GB2006270.9, Search Report dated Jun. 11, 2020, 1 page.
U.S. Appl. No. 17/002,105 Non-Provisional Application, filed Aug. 25, 2020, 72 pages.
GB Application No. GB2006267.5, Examination Report dated Jun. 12, 2020, 2 pages.
GB Application No. GB2007273.2, Examination Report dated Jun. 15, 2020, 2 pages.
GB Application No. GB2006271.7, Examination Report dated Jun. 12, 2020, 2 pages.
U.S. Appl. No. 16/888,290 Notice of Allowance, dated Nov. 13, 2020, 20 pages.
U.S. Appl. No. 16/888,222 Non-Final Office Action, dated Dec. 16, 2020 pages.
U.S. Appl. No. 16/888,282 Office Action-Restriction Requirement, dated Dec. 18, 2020, 7 pages.
U.S. Appl. No. 16/888,282 Non-Final Office Action, dated Mar. 8, 2021, 95 pages.
Extended European Search Report, Application No. 20194300.8, dated Feb. 9, 2021, 8 pages.
U.S. Appl. No. 16/888,222 Notice of Allowance, dated May 18, 2021, 36 pages.
U.S. Appl. No. 16/888,296 Office Action Restriction Requirement, dated Jul. 16, 202', 6 pages.
Canadian Application No. 3080041, Office Action, dated Jun. 29, 2021, 6 pages.
Canadian Application No. 3,089,796, Office Action, dated Jun. 25, 2021, 5 pages.
U.S. Appl. No. 16/888,296 Non-Final Office Action, dated Sep. 27, 2021, 54 pages.
U.S. Appl. No. 16/888,282 Final Office Action, dated Sep. 30, 2021, 30 pages.

* cited by examiner

ELECTRODELESS SIDE-MOUNTED LED STRING LIGHT, METHOD AND APPARATUS FOR MANUFACTURING THE SAME

CROSS-REFERENCE TO RELATED APPLICATION

The present application claims the benefit of Chinese Patent Application No. 2019108439611, filed on Sep. 6, 2019, the entire content of which is incorporated herein in its entirety.

TECHNICAL FIELD

The present disclosure relates to a field of lightings, in particular, to an electrodeless side-mounted LED string light, a method and an apparatus for manufacturing the same.

BACKGROUND

A LED string light is a type of decorative lighting including light bulbs, wires, etc., widely used in decoration, architecture, landscape industries and the like. The LED string light is more popular because of its energy saving, environmental protection, beautiful appearance and low price. Conventional LED string light typically consists of two side-by-side wires and a number of surface-mounted LEDs encapsulated on the wires. The LED string light is welded with one LED in one assembly position, and thus the utilization rate of the wire is not high, which causes great waste of manpower, raw materials and apparatus. Moreover, the LEDs are unipolar, and when they are used, positive and negative electrodes of the string light need to correspond to positive and negative electrodes of a drive power so that the LEDs can be illuminated, which is inconvenient to use.

SUMMARY

As for the above condition of the prior art, the present disclosure provides an electrodeless side-mounted LED string light with high wire utilization and convenient use. The present disclosure also provides a method and an apparatus for manufacturing the electrodeless side-mounted LED string light.

For solving the above technical problems, the present disclosure provides an electrodeless side-mounted LED string light including: a first wire and a second wire arranged side by side or intertwisted with each other, wherein each of the first wire and the second wire comprises a wire core and an insulating layer covering a surface of the wire core, a plurality of first welding spots are formed by removing the insulating layer of the first wire at a set length interval along an axial direction thereof, a plurality of second welding spots are formed by removing the insulating layer of the second wire at a set length interval along an axial direction thereof, and wherein positions of the plurality of the first welding spots are in one-to-one correspondence with positions of the plurality of the second welding spots so as to form a plurality of welding light regions;

a plurality of LED units disposed at the plurality of welding light regions, respectively, wherein each LED unit comprises a first surface-mounted LED and a second surface-mounted LED, and wherein positions of the positive electrodes and the negative electrodes of the first surface-mounted LED and the second surface-mounted LED are oppositely disposed, and wherein a luminous surface of the first surface-mounted LED and a luminous surface of the second surface-mounted LED are opposite to each other, and wherein the luminous surface of the first surface-mounted LED faces a front side along the axial direction of the wire, the luminous surface of the second surface-mounted LED faces a rear side along the axial direction of the wire, and wherein the two weld legs of the first surface-mounted LED and the second surface-mounted LED of each LED unit are respectively welded onto the first and second welding spots of the corresponding welding light region; and a plurality of encapsulants respectively applied on the surfaces of the first surface-mounted LEDs 123 and the second surface-mounted LEDs 124 of the plurality of LED units, to form a plurality of lighting beads.

According to the electrodeless side-mounted LED string light, each welding light region is welded with two surface-mounted LEDs, and thus the utilization rate of the lighting wire of the string light is improved, the utilization rates of raw materials and apparatus are improved, the product quality and manufacturing efficiency are improved. In addition, the positive and negative electrodes of the two surface-mounted LEDs are opposite. In this way, when the positive current is applied, one of the surface-mounted LEDs is illuminated, the other surface-mounted LED is not illuminated, and when the reverse current is applied, the one of the surface-mounted LEDs is not illuminated, the other surface-mounted LED is illuminated. Therefore, a non-polar effect is achieved, and it is convenient to be used. Moreover, the first surface-mounted LED and the second surface-mounted LED may be disposed to have different colors, such that the colors thereof may be changed by changing the direction in which the current is applied. When the alternating current is applied, color mixing effect of any two colors may be completed according to the surface-mounted LED and the applied phosphor.

In one of the embodiments, the first surface-mounted LED and the second surface-mounted LED of each LED unit are positioned between the first welding spot and the second welding spot of the corresponding welding light region.

In one of the embodiments, the plurality of first welding spots of the first wire and the plurality of second welding spots of the second wire are both bend outward to form bent portions, the first surface-mounted LED and the second surface-mounted LED of each LED unit are positioned between the two bent portions of the corresponding welding light region.

In one of the embodiments, the first surface-mounted LED and the second surface-mounted LED of each LED unit have different colors.

The disclosure provides a method for manufacturing an electrodeless side-mounted LED string light including the steps of:

supplying a first wire and a second wire by a wire supply mechanism;

transporting the first wire and the second wire to a stripping station by a wire transporting mechanism, forming first and second welding spots by stripping off insulating layers of the first wire and the second wire respectively at a set interval by a wire stripping mechanism, wherein positions of the first welding spots are in one-to-one correspondence with positions of the second welding spots so as to form welding light regions;

transporting the first welding spots and the second welding spots to a spot-welding material station by the wire transporting mechanism, applying welding materials to surfaces of the first welding spots and the second welding spots by a spot-welding material mechanism;

transporting the first welding spots and the second welding spots with applied welding materials on the surfaces thereof to a LED placing station by the wire transporting mechanism, placing first and second surface-mounted LEDs at the welding light regions by a LED placing mechanism, wherein positions of positive electrodes and negative electrodes of the first surface-mounted LED and the second surface-mounted LED are disposed to be opposite, luminous surfaces of the first surface-mounted LEDs are opposite to luminous surfaces of the second surface-mounted LEDs, the luminous surfaces of the first surface-mounted LEDs face a front side along the axial direction of the wire, and the luminous surfaces of the second surface-mounted LEDs face a rear side along the axial direction of the wire;

transporting the first surface-mounted LEDs and the second surface-mounted LEDs to a welding station by the wire transporting mechanism, welding two weld legs of the first surface-mounted LED and the second surface-mounted LED onto the first welding spot and the second welding spot, respectively;

transporting the first surface-mounted LEDs and the second surface-mounted LEDs after being welded to a welding detection station by the wire transporting mechanism, detecting welding quality of the first surface-mounted LEDs and the second surface-mounted LEDs by a welding detection mechanism; and transporting the first surface-mounted LEDs and the second surface-mounted LEDs after being detected to an encapsulating station by the wire transporting mechanism, and encapsulating the first surface-mounted LEDs and the second surface-mounted LEDs in encapsulants by an encapsulating mechanism to form lighting beads.

In one of the embodiments, before placing the first and second surface-mounted LEDs at the welding light regions by the LED placing mechanism, there is a step of:

bending the first welding spots of the first wire and the second welding spots of the second wire outward to form bent portions.

In one of the embodiments, placing the first and second surface-mounted LEDs at the welding light regions by the LED placing mechanism comprises:

using a robotic suction assembly to suction the first surface-mounted LEDs from a feeding assembly, and placing the first surface-mounted LEDs flat on a placement site of a transit positioning assembly;

using a rotary surface-mounting assembly to grab the first surface-mounted LEDs from the placement site of the transit positioning assembly, and to drive the first surface-mounted LEDs to side-mount on the welding light regions after 90 degrees of rotation in a clockwise or an anticlockwise direction;

using the robotic suction assembly to suction the second surface-mounted LEDs from the feeding assembly, and placing the second surface-mounted LEDs flat on the placement site of the transit positioning assembly;

using the rotary surface-mounting assembly to grab the second surface-mounted LEDs from the placement site of the transit positioning assembly, and to drive the second surface-mounted LEDs to side-mount on the welding light regions after 270 degrees of rotation in an anticlockwise or a clockwise direction.

The disclosure provides an apparatus for manufacturing an electrodeless side-mounted LED string light including:

a wire supply mechanism configured to supply a first wire and a second wire side by side;

a wire stripping mechanism configured to strip off insulating layers on the surfaces of the first wire and the second wire at a set interval to form first and the second welding spots, and wherein the first welding spots are in one-to-one correspondence with the second welding spots to form welding light regions;

a spot-welding material mechanism configured to apply welding materials onto surfaces of the first welding spots and the second welding spots;

a LED placing mechanism configured to place the first surface-mounted LEDs and the second surface-mounted LEDs at the welding light regions, wherein luminous surfaces of the first surface-mounted LEDs are opposite to luminous surfaces of the second surface-mounted LED, and wherein the luminous surfaces of the first surface-mounted LEDs faces a front side along an axial direction of the wire, and the luminous surfaces of the second surface-mounted LEDs face a rear side along an axial direction of the wire, and wherein positions of the positive electrodes and the negative electrodes of the first surface-mounted LED and the second surface-mounted LED are oppositely disposed, and wherein the first surface-mounted LEDs and the second surface-mounted LEDs are transported to a welding station by a wire transporting mechanism;

a welding mechanism configured to weld two weld legs of the first surface-mounted LEDs and the second surface-mounted LEDs onto the first welding spots and the second welding spots, respectively;

a detection mechanism configured to detect welding quality of the first surface-mounted LEDs and the second surface-mounted LEDs;

an encapsulating mechanism configured to encapsulate the first surface-mounted LEDs and the second surface-mounted LEDs in encapsulants to form lighting beads; and a wire transporting mechanism configured to transport the first wire and the second wire.

In one of the embodiments, the LED placing mechanism includes:

a feeding assembly configured to supply the first surface-mounted LEDs and the second surface-mounted LEDs;

a transit positioning assembly provided with a placement site for placing the first surface-mounted LEDs and the second surface-mounted LEDs flat;

a robotic suction assembly configured to suction the first surface-mounted LEDs or the second surface-mounted LEDs from the feeding assembly, and placing the first surface-mounted LEDs or the second surface-mounted LEDs on the placement site of the transit positioning assembly; and a rotary surface-mounting assembly configured to grab the first surface-mounted LEDs from the placement site of the transit positioning assembly, and drive the first surface-mounted LEDs to side-mount on the welding light regions after 90 degrees of rotation in a clockwise or an anticlockwise direction, and configured to grab the second surface-mounted LEDs from the placement site of the transit positioning assembly, and drive the second surface-mounted LEDs to surface-mount on the welding light regions after 90 degrees of rotation in a direction opposite to the clockwise or anticlockwise direction.

In one of the embodiments, a wire forming mechanism is disposed between the spot-welding material mechanism and the LED placing mechanism, the wire forming mechanism includes:

an upper forming mold provided with a trunking through which the first wire and the second wire pass;

a platen assembly including a platen located above the upper forming mold and capable of lifting up and down and a platen driving device for driving the platen to lift up and down;

a lower forming mold capable of lifting up and down with respect to the upper forming mold, the lower forming mold including a punch for bending both of the first welding spots of the first wire and the second welding spots of the second wire outward to form bent portions; and a lower forming mold driving device configured to drive the lower forming mold to lift up and down.

The advantageous effects of the additional technical features of the present disclosure will be illustrated in detailed description of the present specification.

10—a support frame, 20—a wire supply mechanism, 30—a wire stripping mechanism, 40—a wire transporting mechanism, 50—a spot-welding material mechanism, 60—a LED placing mechanism, 61—a feeding assembly, 62—a transit positioning assembly, 621—a placement site, 63—a robotic suction assembly, 631—a suction rod, 632—a robot, 64—a rotary surface-mounting assembly, 641—a grabbing finger, 642—a clamping cylinder, 643—a moving cylinder, 644—a rotating shaft, 645—a holder, 70—a welding mechanism, 80—a detection mechanism, 90—an encapsulating mechanism, 901—an encapsulant spot-applying mechanism, 902—a curing mechanism, 100—a wire forming mechanism, 101—an upper forming mold, 102—a platen assembly, 103—a lower forming mold, 103a—a punch, 104—a platen cylinder, 105—a lower forming mold cylinder, 110—a final processing mechanism, 111—a take-up wheel, 112—a take-up motor, 120—a LED string light, 121—a first wire, 121a—a bent portion, 122—a second wire, 122a—a bent portion, 123—a first surface-mounted LED, 124—a second surface-mounted LED, 125—encapsulant.

DETAILED DESCRIPTION OF THE EMBODIMENTS

The disclosure will be described in detail hereinafter with reference to the accompanying drawings in conjunction with the embodiments. It should be noted that the features in the following embodiments and embodiments may be combined with each other without conflict.

The upper, lower, left, and right in the embodiment are used only for convenience of description, and are not intended to limit the scope of the present disclosure, and the change or adjustment of the relative relationship in the embodiment should be considered as be fallen in the scope of implementation of the present disclosure.

Figure 1:
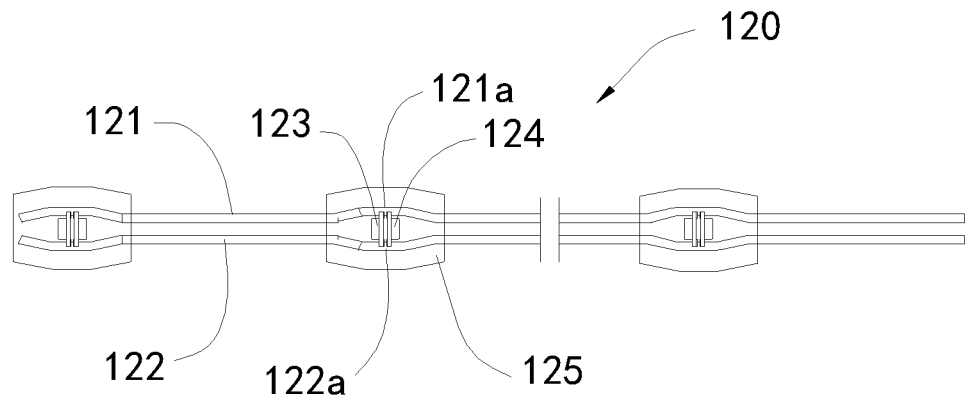
FIG. 1 is a structural schematic view of an electrodeless side-mounted LED string light according to a first embodiment of the present disclosure.

FIG. 1 is a structural schematic view of an electrodeless side-mounted LED string light according to a first embodiment of the present disclosure. As shown in FIG. 1, the electrodeless side-mounted LED string light 120 includes a first wire 121, a second wire 122, a plurality of LED units and a plurality of encapsulants 125. The first wire 121 and the second wire 122 are arranged side by side. Both of the first wire 121 and the second wire 122 includes a wire core (not shown) and an insulating layer (not shown) covered on the surface of the wire core. The first wire 121 and the second wire 122 in the embodiment may be a rubber wire or an enameled wire. A plurality of first welding spots (not shown) and a plurality of second welding spots (not shown) are formed by removing insulating layers of the first wire 121 and the second wire 122 at a set length interval along an axial direction thereof, respectively. The positions of the plurality of second welding spots are in one-to-one correspondence with the positions of the plurality of first welding spots, to form a plurality of welding light regions. A plurality of LED units are disposed at the welding light regions, respectively. Each LED unit includes a first surface-mounted LED 123 and a second surface-mounted LED 124. A luminous surface of the first surface-mounted LED 123 and a luminous surface of the second surface-mounted LED 124 are opposite to each other. The luminous surface of the first surface-mounted LED 123 faces the front side along the axial direction of the wire, the luminous surface of the second surface-mounted LED 124 faces the rear side along the axial direction of the wire. The positions of the positive electrodes and the negative electrodes of the first surface-mounted LED 123 and the second surface-mounted LED 124 are oppositely disposed. The two weld legs of the first surface-mounted LED 123 and the second surface-mounted LED 124 of each LED unit are respectively welded onto the first and second welding spots of the corresponding welding light regions. The plurality of encapsulants 125 are respectively applied on the surfaces of the first surface-mounted LEDs 123 and the second surface-mounted LEDs 124 of the plurality of LED units, to form a plurality of lighting beads.

According to the electrodeless side-mounted LED string light, each welding light region is welded with two surface-mounted LEDs, and thus the utilization rate of the lighting wire of the string light is improved, the utilization rates of raw materials and apparatus are improved, the product quality and manufacturing efficiency are improved. In addition, the positive and negative electrodes of the two surface-mounted LEDs are opposite. In this way, when the positive current is applied, one of the surface-mounted LEDs is illuminated, the other surface-mounted LED is not illuminated, and when the reverse current is applied, the one of the surface-mounted LEDs is not illuminated, the other surface-mounted LED is illuminated. Therefore, a non-polar effect is achieved, and it is convenient to be used.

In one embodiment, the first surface-mounted LED 123 and the second surface-mounted LED 124 of each LED unit are positioned between the first welding spot and the second welding spot of the corresponding welding light region. In this way, the welding is stronger.

In one embodiment, the first welding spots of the first wire 121 and the second welding spots of the second wire 122 are both bent outward, to form bent portions 121a, 122a. The first surface-mounted LED 123 and the second surface-mounted LED 124 of LED unit are positioned between the two bent portions 121a and 122a. In this way, the first surface-mounted LED 123 and the second surface-mounted LED 124 are stuck between two bent portions 121a and 122a, such that it is easy to perform surface-mounting.

In one embodiment, the first surface-mounted LED 123 and the second surface-mounted LED 124 of LED unit have different colors, such that the colors thereof may be changed by changing the current direction. When the alternating current is applied, color mixing effect of any two colors may be completed according to the surface-mounted LED and the applied phosphor.

Figure 2:
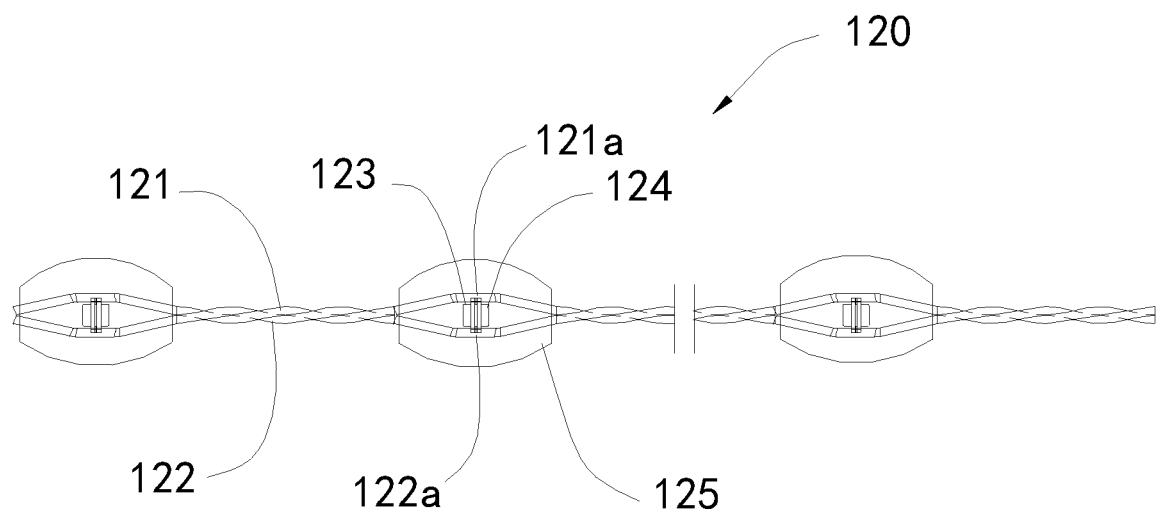
FIG. 2 is a structural schematic view of an electrodeless side-mounted LED string light according to a second embodiment of the present disclosure.

FIG. 2 is a structural schematic view of an electrodeless side-mounted LED string light according to a second embodiment of the present disclosure. As shown in FIG. 2, it differs from the above embodiment in that the first wire 121 and the second wire 122 of the electrodeless side-mounted LED string light are spirally intertwisted with each other.

Figure 3:
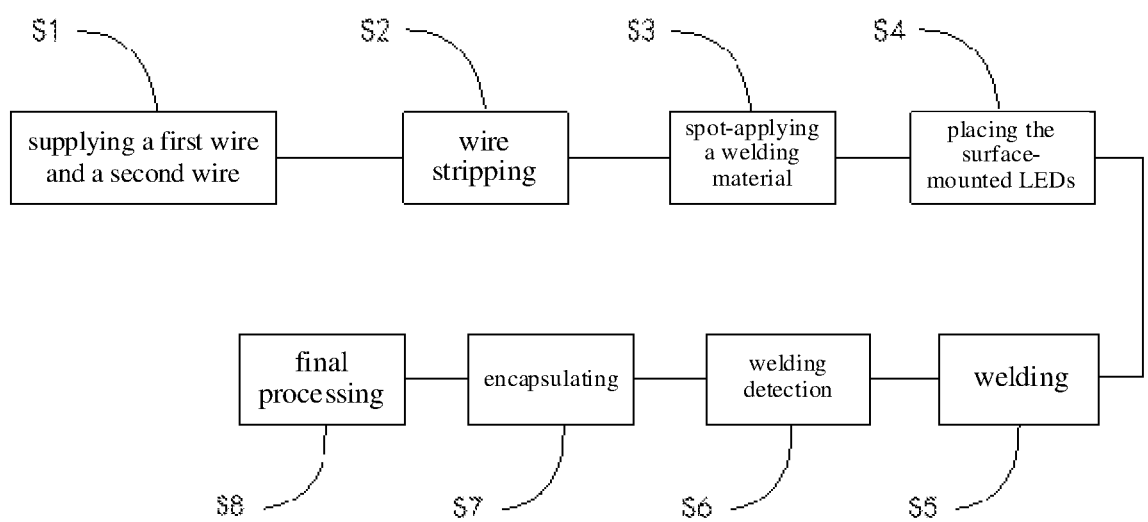
FIG. 3 is a flowchart of a method for manufacturing the electrodeless side-mounted LED string light according to an embodiment of the present disclosure.

In one embodiment of the present disclosure, it provides a method of automated manufacturing the LED string light. As shown in FIG. 3, the method includes the following steps:

Step S1, supplying a first wire and a second wire. The first wire and the second wire are supplied by a wire supply mechanism.

Step S2, wire stripping. The first wire and the second wire are transported to a stripping station by a wire transporting mechanism. The insulating layers on surfaces of the first wire 121 and the second wire 122 are stripped off at a set interval by a wire stripping mechanism, to form first and second welding spots. The positions of the first welding spots are in one-to-one correspondence with the positions of the second welding spots, to form welding light regions.

Step S3, spot-applying a welding material. The first welding spots and the second welding spots are transported to a spot-welding material station by the wire transporting mechanism. Welding materials are applied to surfaces of the first welding spots and the second welding spots by a spot-welding material mechanism.

Step S4, placing the surface-mounted LEDs. The first welding spots and the second welding spots whose surfaces have been applied with the welding materials are transported to a LED placing station by the wire transporting mechanism. The first surface-mounted LEDs 123 and the second surface-mounted LEDs 124 are placed at the welding light regions by a LED placing mechanism. The luminous surfaces of the first surface-mounted LEDs 123 are opposite to the luminous surfaces of the second surface-mounted LEDs 124. The luminous surfaces of the first surface-mounted LEDs 123 face the front side along the axial direction of the wire, the luminous surfaces of the second surface-mounted LEDs 124 face the rear side along the axial direction of the wire. The positions of the positive electrodes and the negative electrodes of the first surface-mounted LEDs 123 and the second surface-mounted LEDs 124 are oppositely disposed. In particular, firstly, the first surface-mounted LEDs 123 is side-mounted on the welding light regions, the positive electrodes of the first surface-mounted LEDs 123 are surface-mounted on the first welding spots of the first wire 121, the negative electrodes of the first surface-mounted LEDs 123 are surface-mounted on the second welding spots of the second wire 121. Secondly, the luminous surfaces of the second surface-mounted LEDs 124 and the luminous surfaces of the first surface-mounted LEDs 123 are side-mounted back-to-back in the welding light regions. The positive electrodes of the second surface-mounted LEDs 124 are surface-mounted on the second welding spots of the second wire 122, the negative electrodes of the second surface-mounted LEDs 124 are surface-mounted on the first welding spots of the first wire 121.

Step S5, welding. The first surface-mounted LEDs 123 and the second surface-mounted LEDs are transported to a welding station by the wire transporting mechanism. The positive and negative electrodes of the first surface-mounted LEDs 123 and the second surface-mounted LEDs 124 are welded with the first welding spots of the first wire 121 and the second welding spots of the second wire 122 by a welding mechanism, respectively.

Step S6, welding detection. The first surface-mounted LEDs 123 and the second surface-mounted LEDs 124 after being welded are transported to a welding detection station by the wire transporting mechanism, and then a welding detection mechanism performs a detection on welding quality of the surface-mounted LEDs.

Step S7, encapsulating. The first surface-mounted LEDs 123 and the second surface-mounted LEDs 124 after being detected are transported to an encapsulating station by the wire transporting mechanism, and the first surface-mounted LEDs 123 and the second surface-mounted LEDs are encapsulated in the encapsulants 125 by an encapsulating mechanism to form lighting beads.

Step S8, final processing. A subsequent processing is performed on the string light.

According to the method for manufacturing the electrodeless side-mounted LED string light provided by the present disclosure, the full-auto manufacture online of the electrodeless side-mounted LED string light are achieved, and the manufacturing efficiency and quality are significantly improved, while the cost is reduced.

Figure 4:
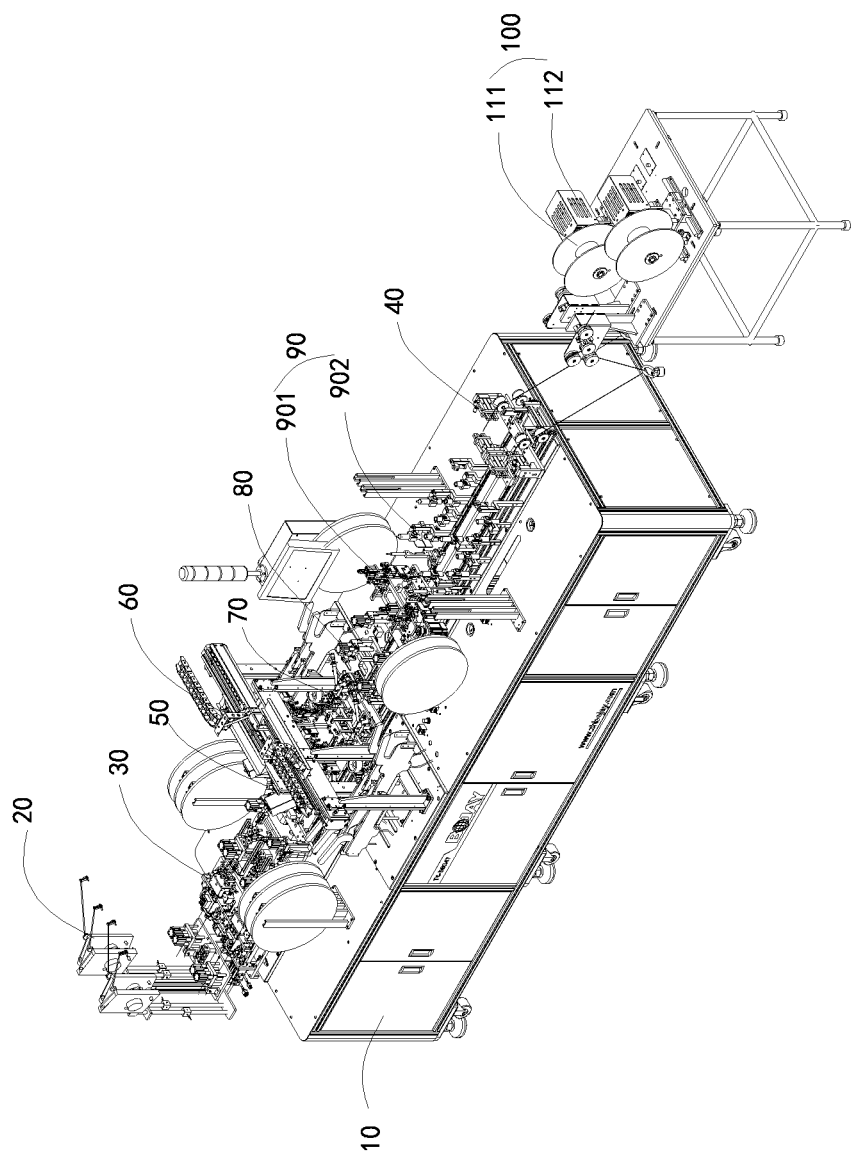
FIG. 4 is an axonometric view of an apparatus for manufacturing the electrodeless side-mounted LED string light according to an embodiment of the present disclosure.

In another embodiment of the present disclosure, there provides an apparatus for manufacturing the electrodeless side-mounted LED string light. As shown in FIG. 4, the apparatus for manufacturing the electrodeless side-mounted LED string light includes a wire supply mechanism 20, a wire stripping mechanism 30, a spot-welding material mechanism 50, a LED placing mechanism 60, a welding mechanism 70, a detection mechanism 80, an encapsulating mechanism 90 and a wire transporting mechanism 40. The wire supply mechanism 20, the wire stripping mechanism 30, the spot-welding material mechanism 50, the LED placing mechanism 60, the welding mechanism 70, the detection mechanism 80, the encapsulating mechanism 90 and the wire transporting mechanism 40 are in a pipelined linear arrangement, and form a full-auto manufacture line of LED. In one embodiment, the apparatus for manufacturing the electrodeless side-mounted LED string light further includes a support frame 10 for supporting the wire supply mechanism 20, the wire stripping mechanism 30, the spot-welding material mechanism 50, the LED placing mechanism 60, the welding mechanism 70, the detection mechanism 80, the encapsulating mechanism 90 and the wire transporting mechanism 40.

Preferably, the apparatus for manufacturing the electrodeless side-mounted LED string light in the embodiment includes two full-auto manufacture line of LED arranged side by side. In this way, two electrodeless side-mounted LED string light may be manufactured simultaneously. The manufacturing efficiency is significantly improved.

The wire supply mechanism 20 is configured to supply the first wire 121 and the second wire 122. The wire supply mechanism 20 in the embodiment includes a coil support (not shown in figures) for placing a coil and a tension controller. The tension controller is used for providing a reversed tension in a wire supply direction for the first wire 121 and the second wire 122, so as to cause the wires to be in a tensioning state by cooperating with a wire clamping assembly.

The wire stripping mechanism 30 is configured to strip off the insulating layers on the surfaces of the first wire 121 and the second wire 122 at a set interval to form the first welding spots and the second welding spots. The wire stripping mechanism 30 in the embodiment includes the wire clamping assembly and a wire stripping knife assembly. The wire clamping assembly is used to position and clamp the first wire 121 and the second wire 122, so as to provide a position basis when the wires are stripping off. The wire clamping assembly in the embodiment includes a front wire clamping mechanism and a rear wire clamping mechanism arranged to be opposite at a certain interval along a direction of movement of the first wire 121 and the second wire 122. In one embodiment, both of the front and rear wire clamping mechanism include a spacer, a briquetting above the spacer and a cylinder for driving the briquetting to move up and down with respect to the spacer. The wire stripping knife assembly is positioned between the front wire clamping mechanism and the rear wire clamping mechanism, and is used to strip off the insulating layers on the surfaces of the first wire 121 and the second wire 122 where the welding is to be performed, to form the first welding spots and the second welding spots. The wire stripping knife assembly belongs to the prior art, and the redundant description thereof will not be further described herein.

The spot-welding material mechanism 50 is configured to apply the welding materials onto the first welding spots and the second welding spots of the first wire 121 and the second wire 122. The spot-welding material mechanism 50 in the embodiment includes a visual positioning assembly, a wire positioning assembly and a tin spot-applying assembly. The visual positioning assembly and the wire positioning assembly are used to accurately position the first welding spots and the second welding spots of the first wire 121 and the second wire 122. The tin spot-applying assembly is used to apply welding materials onto the first welding spots and the second welding spots of the first wire 121 and the second wire 122. In one embodiment, the tin spot-applying assembly includes a tin spot-welding syringe above the first wire 121 and the second wire 122 and an air-supply to sin spot-welding device for supply air to the sin spot-welding syringe.

The LED placing mechanism 60 is used for side-mounting the first surface-mounted LEDs 123 in the welding light regions firstly, wherein the positive electrodes of the first surface-mounted LEDs 123 are surface-mounted on the first welding spots of the first wire 121 and the negative electrodes of the second surface-mounted LEDs 123 are surface-mounted on the second welding spots of the second wire 121, and then the luminous surfaces of the second surface-mounted LEDs 124 and the luminous surfaces of the first surface-mounted LEDs 123 are side-mounted back-to back in the welding light regions. The positive electrodes of the second surface-mounted LEDs 124 are surface-mounted on the second welding spots of the second wire 122, the negative electrodes of the second surface-mounted LEDs 124 are surface-mounted on the first welding spots of the first wire 121.

Figure 5:
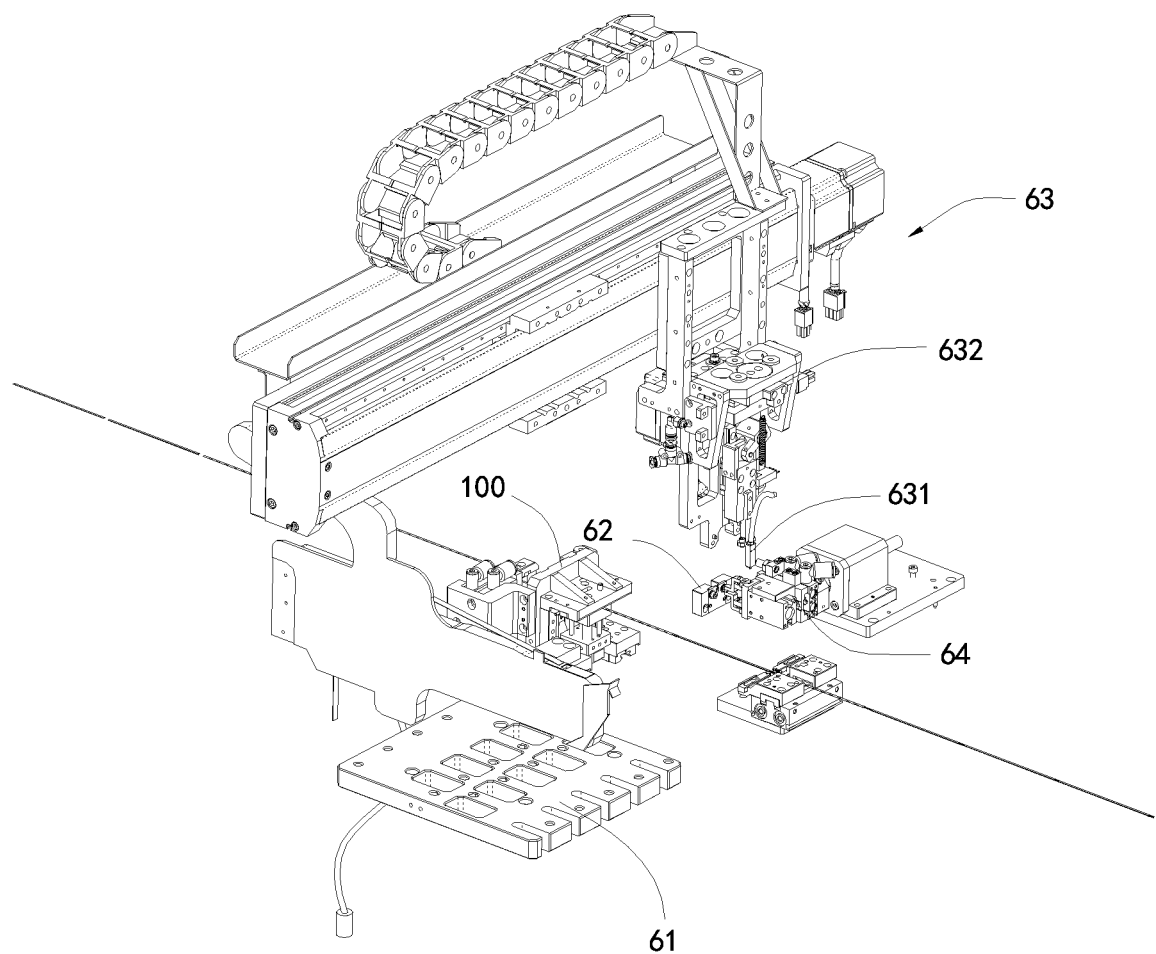
FIG. 5 is a perspective view of a LED placing mechanism of the apparatus for manufacturing the electrodeless side-mounted LED string light according to an embodiment of the present disclosure.
Figure 6:
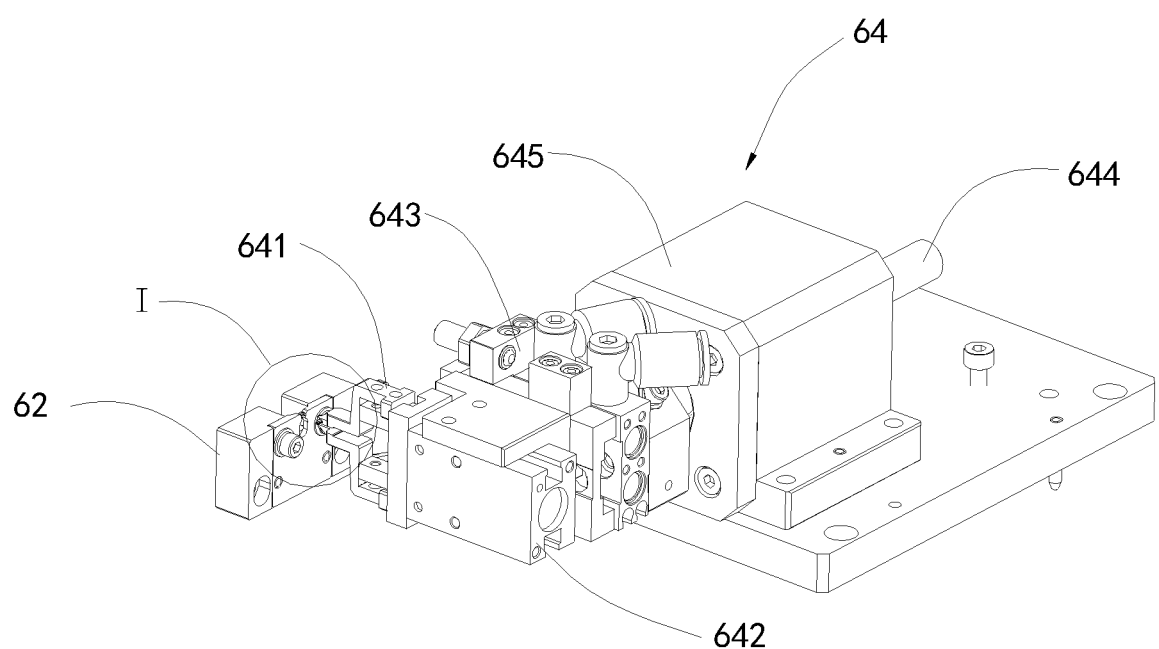
FIG. 6 is a perspective view of a transit positioning assembly and a rotary surface-mounting assembly according to an embodiment of the present disclosure.
Figure 7:
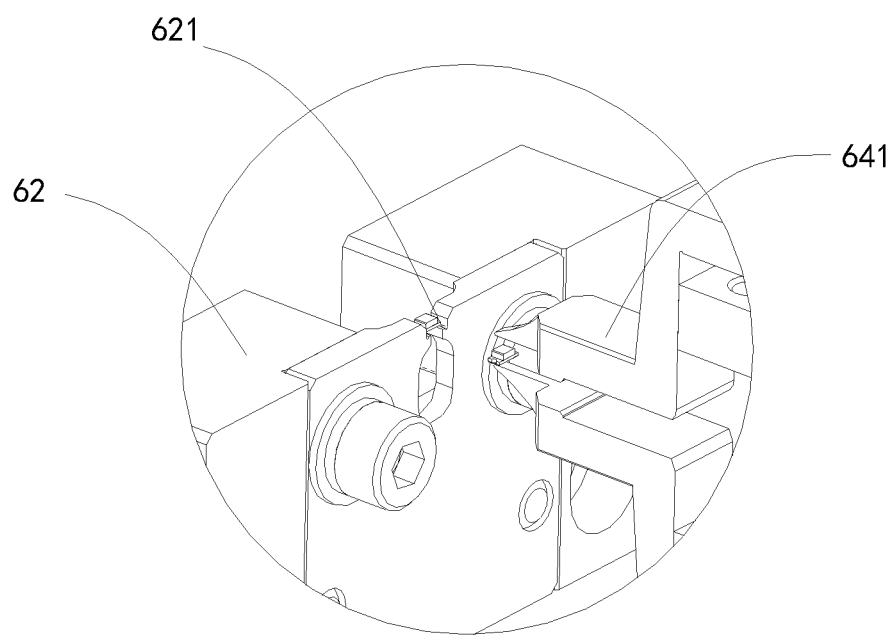
FIG. 7 is a partially enlarged schematic view of portion I of FIG. 6.

As shown in FIGS. 5 to 7, the LED placing mechanism 60 includes a feeding assembly 61, a transit positioning assembly 62, a robotic suction assembly 63 and a rotary surface-mounting assembly 64. The feeding assembly 61 is configured to supply the first surface-mounted LEDs 123 and the second surface-mounted LEDs 124. The transit positioning assembly 62 is provided with a placement site 621 for placing the first surface-mounted LEDs 123 and the second surface-mounted LEDs 124 flat. The robotic suction assembly 63 is configured to suction the first surface-mounted LEDs 123 or the second surface-mounted LEDs 124 from the feeding assembly 61, and place the first surface-mounted LEDs 123 or the second surface-mounted LEDs 124 on the placement site 621 of the transit positioning assembly 62. The robotic suction assembly 63 in the embodiment includes a suction rod 631 and a robot 632. The suction rod 631 is configured to suction the surface-mounted LEDs by means of a vacuum generating device. The robot 632 is configured to drive the suction rod 631 to reciprocate between the feeding assembly 61 and the transit positioning assembly 62.

The rotary surface-mounting assembly 64 is configured to grab the first surface-mounted LEDs 123 from the placement site 621 of the transit positioning assembly 62, and drive the first surface-mounted LEDs 123 to side-mount on the welding light regions after 90 degrees of rotation in a clockwise direction, and is configured to grab the second surface-mounted LEDs 124 from the placement site 621 of the transit positioning assembly 62, and drive the second surface-mounted LEDs 124 to surface-mount on the welding light regions after 270 degrees of rotation in an anticlockwise direction. As shown in FIGS. 6 and 7, the rotary surface-mounting assembly 64 includes a grabbing finger 641, a clamping cylinder 642, a moving cylinder 643, a rotating shaft 644 and the driving motor (not shown). The grabbing finger 641 is used to grabbing and releasing the surface-mounted LEDs. The clamping cylinder 642 is used to drive the grabbing finger 641 to move between a grabbing position and a releasing position. The moving cylinder 643 is used to drive the clamping cylinder 642 to move. The moving cylinder 643 is rotatably mounted on a holder 645 by a rotating shaft. The rotating shaft 644 is connected to the driving motor. In operation, the moving cylinder 643 drives the grabbing finger 641 to extend out to the placement site 621 of the transit positioning assembly 62, and the clamping cylinder 642 operates to drive the grabbing finger 641 to move to the grabbing position, at which time the moving cylinder 643 is retracted and the driving motor rotates in the positive or negative direction, and thus drives the grabbing finger 641 to rotate in the positive or negative direction. The moving cylinder 643 extends out, and the grabbing finger 641 is lowered to the welding light regions. The first and second surface-mounted LEDs are tightly attached to the first wire 121 and the second wire 122 to fix the surface-mounted LEDs, by using the medium pressure applied by the grabbing finger 641.

Figure 8:
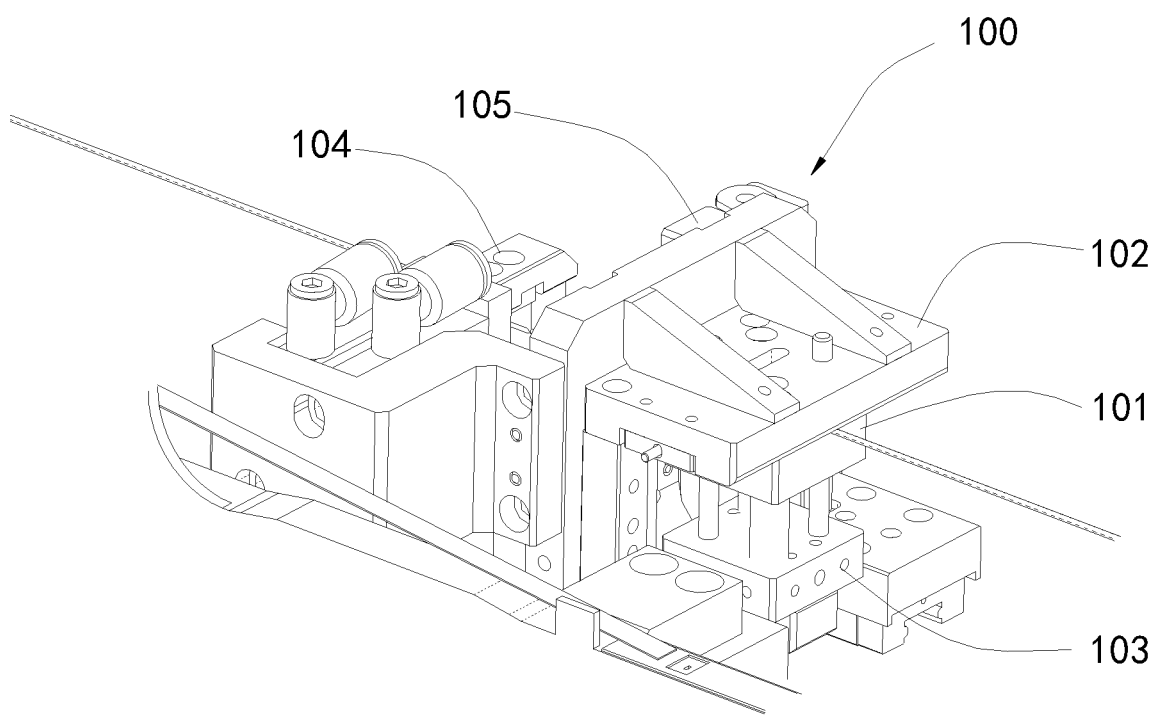
FIG. 8 is a perspective view of a wire forming mechanism of the apparatus for manufacturing the electrodeless side-mounted LED string light according to an embodiment of the present disclosure.
Figure 9:
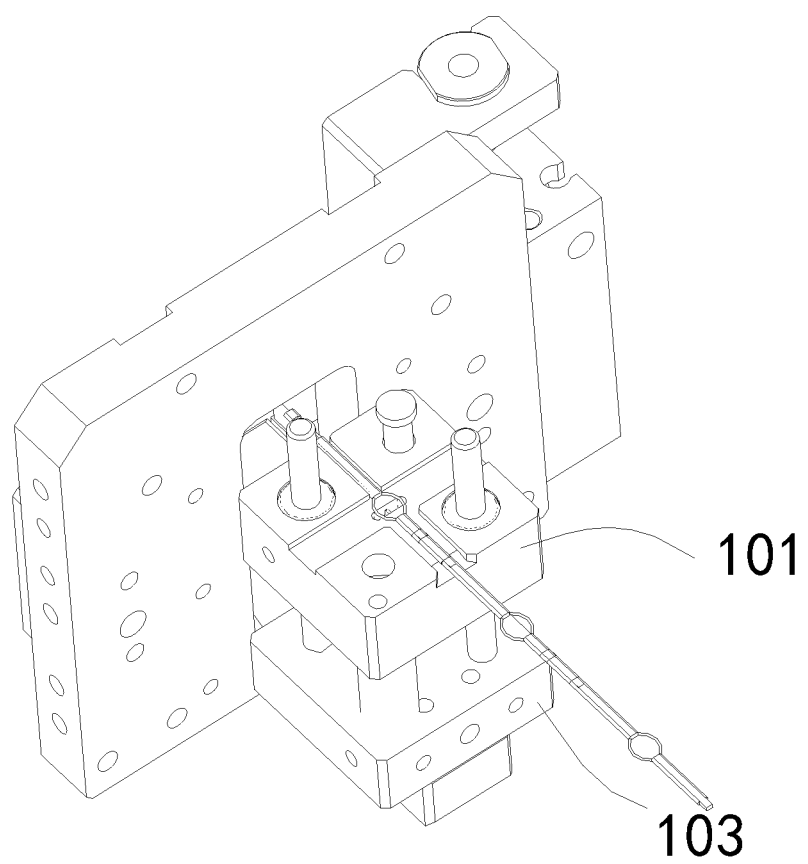
FIGS. 9 and 10 are a perspective view of an upper forming mold and a cross-section view of a lower forming mold of the wire forming mechanism.
Figure 10:
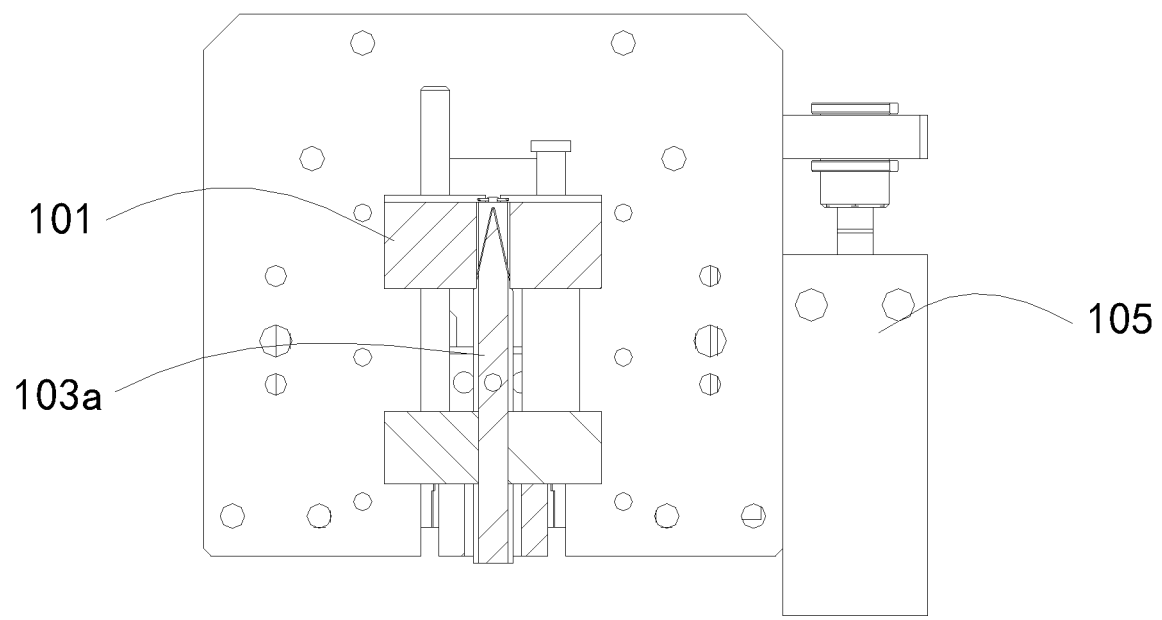

In one embodiment, a wire forming mechanism 100 is disposed between the spot-welding material mechanism and the LED placing mechanism 60. As shown in FIGS. 8 to 10, the wire forming mechanism 100 includes an upper forming mold 101, a platen assembly 102, a lower forming mold 103 and a lower forming mold cylinder 105. The upper forming mold 101 is provided with a trunking through which the first wire 121 and the second wire 122 pass. The platen assembly 102 includes a platen above the upper forming mold 101 and capable of lifting up and down and a platen cylinder 104 for driving the platen to lift up and down. When the platen is moving downwards, the platen will cooperate with the upper forming mold 101 to clamp the first wire 121 and the second wire 122. The lower forming mold 103 may be lifted up and down with respect to the upper forming mold 101. The lower forming mold 103 includes a punch 103a for bending both of the first welding spots of the first wire 121 and the second welding spots of the second wire 122 outward to form bent portions. The lower forming mold cylinder 105 is configured to drive the lower forming mold 103 to lift up and down.

The welding mechanism 70 is configured to weld the positive and negative electrodes of the first surface-mounted LEDs 123 and the second surface-mounted LEDs 124 with the first welding spots of the first wire 121 and the second welding spots of the second wire 122, respectively. The welding mechanism 70 may be a laser welding device, a hot gas welding device and the like.

The detection mechanism 80 is configured to detect the welding quality of the surface-mounted LEDs. The detection mechanism 80 includes an on-off assembly and a photosensitive detecting assembly. The on-off assembly is used to provide voltage between the first wire 121 and the second wire 122. The photosensitive detecting assembly determines the lighting of welding for the LED by using a photosensitive detection or a visual inspection, and signals the good and the defective.

The encapsulating mechanism 90 is configured to encapsulate the surface-mounted LEDs in the encapsulants 125. The encapsulating mechanism 90 in the embodiment includes an encapsulant spot-applying mechanism 901 and a curing mechanism 902. The encapsulant spot-applying mechanism 901 is used to apply the encapsulants onto the surfaces of the surface-mounted LEDs. The curing mechanism 902 is used to curing the liquid of the encapsulants on the surfaces of the surface-mounted LEDs. The curing mechanism 902 in the embodiment rapidly cures the liquid of the previous process by using the UV cured principle. Preferably, the curing mechanism 902 includes a pre-curing assembly and a secondary curing assembly arranged in sequence in a direction in which the wire is supplied. The pre-curing assembly and the secondary curing assembly each include a UV lighting and a blowing-sizing device arranged up and down. The UV lighting is used to irradiate the liquid of the encapsulant applied on the surface-mounted LEDs. The blowing and sizing device output airflow to blow, size and pre-cure the liquid of the encapsulant, so as to maintain the welding strength of the wires of the lighting beads, and ensure the insulation of the lighting bead and the wire from the outside. The pre-curing assembly is used to size and cure the encapsulant preliminarily, and the secondary curing assembly is used to further cure the preliminary sized and cured encapsulant, so as to ensure the welding strength between the surface-mounted LEDs and the wires.

The wire transporting mechanism 40 is used for providing power for the travel of the wire. The wire transporting mechanism 40 in the embodiment includes a plurality of linear single-axis robots and a plurality of pneumatic fingers. The plurality of linear single-axis robots are arranged at an interval along the direction in which the wires are supplied, so as to provide power for a linear wire drawing and provide a mounting platform for the pneumatic fingers. The plurality of pneumatic fingers respectively disposed on the plurality of linear single-axis robots, functioning as positioning and clamping the wire.

In one embodiment, the apparatus for manufacturing the electrodeless side-mounted LED string light further includes a final processing mechanism 110. The final processing mechanism 110 is used to perform subsequent processing on the processed surface-mounted LEDs. The final processing mechanism 110 in the embodiment includes a take-up device. The take-up device includes a take-up wheel 111 and a take-up motor 112 for driving the take-up wheel 111 to rotate. The finished LED string light is wound around the take-up wheel 111 to form a bobbin. In addition to the take-up device, the final processing mechanism 110 may also be a wire-stranding device, a wire-trimming device and the like. A type of LED string light having stranded wires is manufactured by the wire-stranding device. A type of LED string light having random lengths may be manufactured by the wire-trimming device.

The above embodiments merely illustrate several embodiments of the present disclosure, although the description thereof is more specific and detailed, but it is not to be construed as limiting the scope of the disclosure. It should be noted that a number of variations and modifications may be made by those skilled in the art without departing from the concept of the disclosure, those are fallen in the protection scope of the disclosure.

What is claimed is:

1. An apparatus for manufacturing a side-mounted LED string light, comprising:

a wire supply mechanism configured to supply a first wire and a second wire side by side;

a wire stripping mechanism configured to strip off insulating layers on surface of the first wire and the second wire at a set interval to form first and second welding spots, and wherein the first welding spots are in one-to-one correspondence with the second welding spots to form welding light regions;

a spot-welding material mechanism configured to apply welding materials onto surfaces of the first welding spots and the second welding spots;

a LED placing mechanism configured to place first surface-mounted LEDs and second surface-mounted LEDs at the welding light regions, wherein luminous surfaces of the first surface-mounted LEDs are opposite to luminous surfaces of the second surface-mounted LEDs, the luminous surfaces of the first surface-mounted LEDs face a front side along an axial direction of the wire, the luminous surfaces of the second surface-mounted LEDs face a rear side along an axial direction of the wire, positions of positive electrodes and negative electrodes of the first surface-mounted LED and the second surface-mounted LED are oppositely disposed, and the first surface-mounted LEDs and the second surface-mounted LEDs are transported to a welding station by a wire transporting mechanism;

a welding mechanism configured to weld two weld legs of the first surface-mounted LED and the second surface-mounted LED onto the first welding spot and the second welding spot, respectively;

a detection mechanism configured to detect welding quality of the first surface-mounted LEDs and the second surface-mounted LEDs;

an encapsulating mechanism configured to encapsulate the first surface-mounted LEDs and the second surface-mounted LEDs in encapsulants to form lighting beads; and a wire transporting mechanism configured to transport the first wire and the second wire, wherein the LED placing mechanism comprises:
- a feeding assembly configured to supply the first surface-mounted LEDs and the second surface-mounted LEDs;
- a transit positioning assembly provided with a placement site for placing the first surface-mounted LEDs and the second surface-mounted LEDs flat;
- a robotic suction assembly configured to suction the first surface-mounted LEDs or the second surface-mounted LEDs from the feeding assembly, and placing the first surface-mounted LEDs or the second surface-mounted LEDs on the placement site of the transit positioning assembly; and
- a rotary surface-mounting assembly configured to grab the first surface-mounted LEDs from the placement site of the transit positioning assembly, and drive the first surface-mounted LEDs to side-mount on the welding light regions after 90 degrees of rotation in a clockwise or an anticlockwise direction, and, configured to grab the second surface-mounted LEDs from the placement site of the transit positioning assembly, and drive the second surface-mounted LEDs to surface-mount on the welding light regions after 90 degrees of rotation in a direction opposite to the clockwise or anticlockwise direction.

2. The apparatus for manufacturing the side-mounted LED string light according to claim 1, wherein a wire forming mechanism is provided between the spot-welding material mechanism and the LED placing mechanism, the wire forming mechanism comprises:
- an upper forming mold provided with a trunking through which the first wire and the second wire pass;
- a platen assembly comprising a platen located above the upper forming mold and capable of lifting up and down and a platen driving device for driving the platen to lift up and down;
- a lower forming mold capable of lifting up and down with respect to the upper forming mold, the lower forming mold comprising a punch for bending both of the first welding spots of the first wire and the second welding spots of the second wire outward to form bent portions; and
- a lower forming mold driving device configured to drive the lower forming mold to lift up and down.

* * * * *